United States Patent [19]

Raoult

[11] Patent Number: 5,673,458

[45] Date of Patent: Oct. 7, 1997

[54] DEVICE FOR FIXING A HANDLE TO A COOKING VESSEL

[75] Inventor: Philippe Raoult, Pringy, France

[73] Assignee: SEB S.A., Ecully, France

[21] Appl. No.: 511,801

[22] Filed: Aug. 7, 1995

[30] Foreign Application Priority Data

Aug. 10, 1994 [FR] France ................. 94 09913

[51] Int. Cl.⁶ ........................................... A47J 45/10
[52] U.S. Cl. ................. 16/114 A; 16/110 A; 16/DIG. 41
[58] Field of Search ............... 16/116 R, 110 A, 16/114 A, 114 R, DIG. 24, DIG. 40, DIG. 41; 403/134, 208, 240

[56] References Cited

U.S. PATENT DOCUMENTS

| 1,577,470 | 3/1926 | Koehler | 16/DIG. 24 |
|---|---|---|---|
| 3,648,887 | 3/1972 | Hartley | 16/116 R |
| 4,032,032 | 6/1977 | Carroll et al. | 16/116 R |
| 4,680,829 | 7/1987 | Baumgarten | 16/114 A |

FOREIGN PATENT DOCUMENTS

| 1079570 | 8/1971 | Australia . | |
|---|---|---|---|
| 10795/70 | 8/1971 | Australia . | |
| 707946 | 4/1965 | Canada | 16/114 |
| 2627974 | 9/1989 | France | 16/116 R |
| 2 683 136 | 5/1993 | France . | |
| 92 07 076 | 7/1992 | Germany . | |
| 2111373 | 7/1983 | United Kingdom | 16/110 A |
| 2118431 | 11/1983 | United Kingdom . | |
| 2186832 | 8/1987 | United Kingdom | 16/114 A |

*Primary Examiner*—Chuck Y. Mah
*Attorney, Agent, or Firm*—Young & Thompson

[57] ABSTRACT

A device for fixing a handle to a cooking vessel comprises a member fixed to the wall of the vessel and including an outwardly projecting central part surrounded by an exterior part whose surface adjacent the wall of the vessel espouses its curved profile. The lateral surface of the projecting central part has a shape matching the interior surface of the ferrule and is engaged in the latter. The front surface of the projecting part incorporates an opening extending outwards by a projecting flange. The interior surface of the opening is smooth. The screw for fixing the handle has a tapping thread that cuts a thread for itself in this opening.

4 Claims, 2 Drawing Sheets

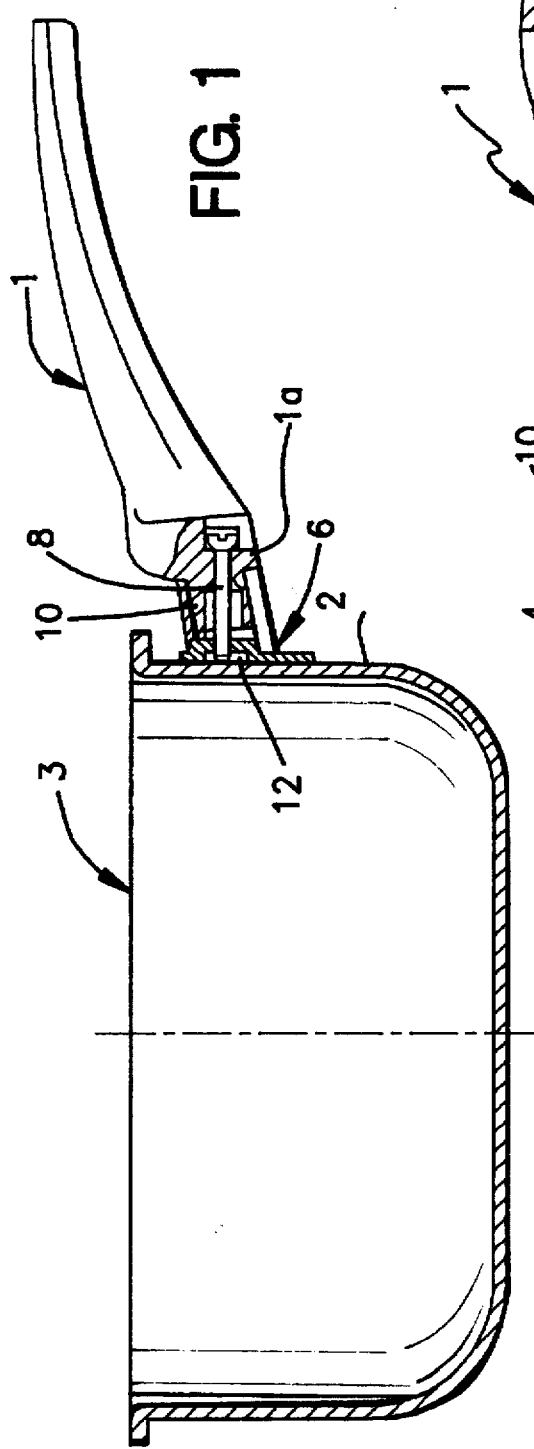
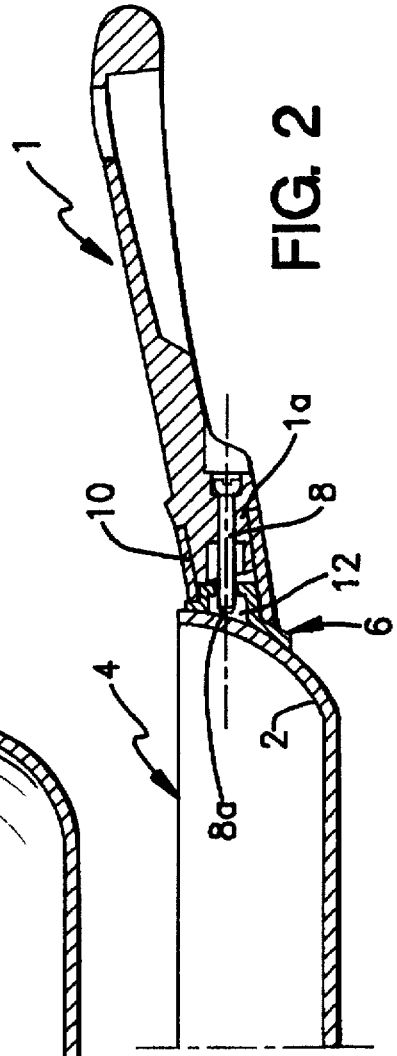
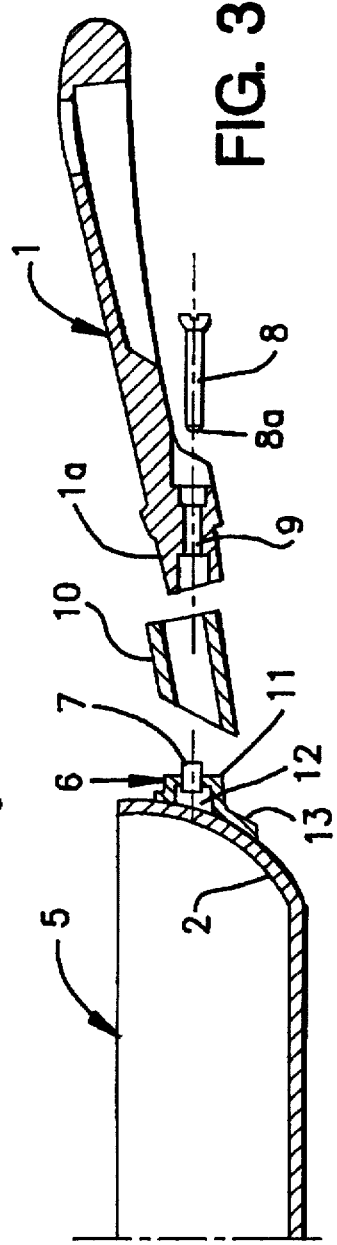

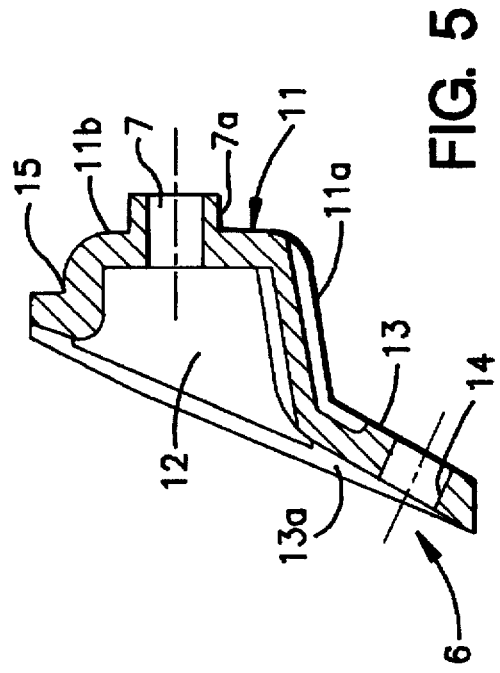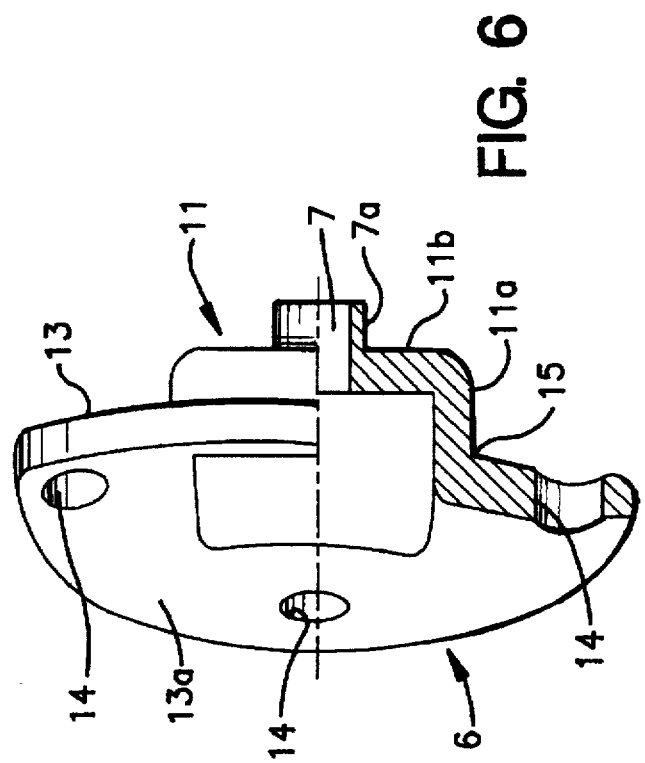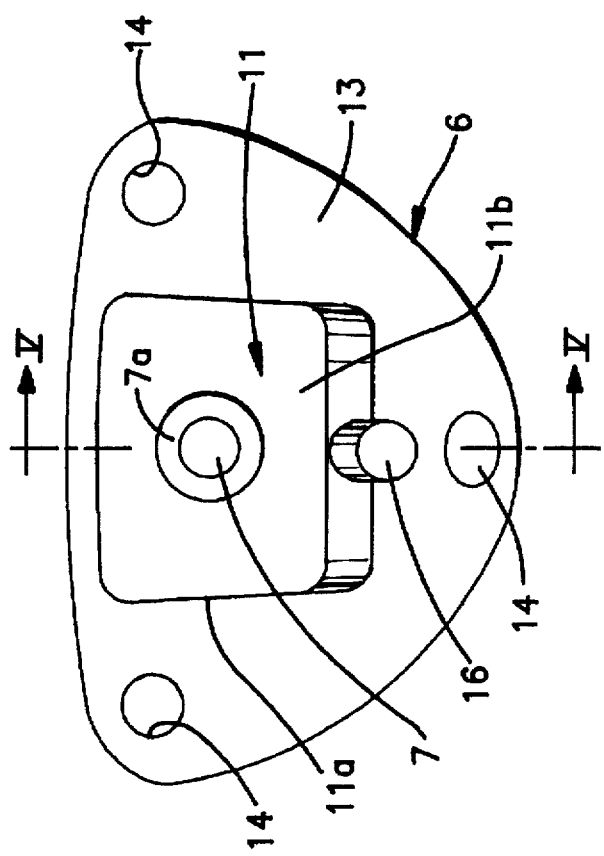

DEVICE FOR FIXING A HANDLE TO A COOKING VESSEL

BACKGROUND OF THE INVENTION

1. Field of the Invention

The present invention concerns a device for fixing a handle to the wall of a cooking vessel and comprising a part adapted to be fixed to said wall including an opening into which is screwed a screw engaged in an elongate opening in the end of the handle and a metal ferrule adapted to be engaged over the end of the handle between the latter and the wall of the vessel.

2. Description of the Prior Art

Prior art fixing devices are either costly, because they include a plurality of parts, or unreliable, because the screw fixing the handle eventually loosens with the result that the handle becomes loose, which is uncomfortable.

GB-A-2 118 431 discloses the use of a stamped sheet metal fixing member including an inwardly projecting central part that with the wall of the vessel defines a cavity, this projecting central part being surrounded by an exterior part whose surface adjacent the wall of the vessel espouses its curved profile.

However, the handle is fixed by a screw and a nut accommodated in the cavity formed by the projecting central part, and this has the drawbacks already mentioned.

Moreover, the fixing member and the ferrule are in contact only at the peripheral end of the ferrule, which has the disadvantage of a weak mechanical connection between the ferrule and the fixing member, usually leading to play between the handle and the wall of the vessel.

An object of the present invention is to provide a device for fixing a handle to the wall of a cooking vessel that is economical, easy to fix to the wall of the vessel, facilitates fitting of the handle and provides a reliable and durable fixing.

SUMMARY OF THE INVENTION

The invention consists in a device for fixing a handle to the wall of a cooking vessel, comprising a member stamped from sheet metal adapted to be fixed to said wall incorporating an opening into which is screwed a screw engaged in an elongate opening formed in the end of said handle and having an outwardly projecting central part defining with said wall of said vessel a cavity and surrounded by an exterior part whose surface adjacent said wall of said vessel espouses its curved profile, said lateral surface of said projecting central part having a shape adapted to fit inside and espouse the interior surface of a metal ferrule adapted to be engaged over the end of said handle between the latter and said wall of said vessel, the front surface of said projecting part incorporating an opening extended outwardly by a projecting flange, the interior surface of said opening being smooth, and said screw having a tapping thread adapted to be engaged in said opening.

This fixing member is economical because it is cut and stamped from sheet metal. It does not require any reinforcing part, nut or washer since the screw has a tapping thread engaged in the deep smooth well formed in the projecting part of the fixing member.

The projecting part has a lateral surface that espouses that of the ferrule with the result that the latter nests virtually without play in the fixing member, strengthening the mechanical connection between the handle and the wall of the vessel.

In one advantageous embodiment of the invention the exterior part of the stamped member incorporates openings for rivets fixed into the wall of the vessel.

It could equally well be fixed by welding, of course.

In one preferred embodiment of the invention the lateral surface of the projecting central part has a plurality of faces over which the ferrule is nested to prevent it rotating.

Said stamped member is preferably cut and stamped from sheet aluminum.

The fabrication of this member is therefore very economical, since aluminum is easily cut and stamped. Moreover, as aluminum is relatively soft, screwing the tapping screw into the smooth opening formed in the projecting part of the fixing member is not in any way difficult and prevents loosening of the screw.

Other features and advantages of the invention will emerge from the following description given by way of non-limiting example with reference to the appended drawings.

BRIEF DESCRIPTION OF THE DRAWINGS

FIG. 1 is a sectional view of a saucepan the handle of which is attached by means of a device in accordance with the invention.

FIG. 2 is a view similar to FIG. 1 showing a shallow type of frypan.

FIG. 3 shows a deeper type of frypan, its handle and its fixing members prior to assembly.

FIG. 4 is a top view of the front of the fixing member of the device of the invention.

FIG. 5 is a view in section on the plane V—V in FIG. 4.

FIG. 6 is a top view of the fixing member with the lower part in section on its median plane of symmetry.

DETAILED DESCRIPTION OF THE PREFERRED EMBODIMENTS

Referring to FIGS. 1 to 3, the device for fixing a handle 1 to the wall 2 of a cooking vessel such as a saucepan 3, shallow frypan 4 or deep frypan 5 comprises a member 6 fixed to said wall 2 and incorporating an opening 7 into which is screwed a screw 8 engaged in an elongate opening 9 formed in the end 1a of the handle 1. A metal ferrule 10 is engaged over the end of the handle 1 and fits between the latter and the wall 2 of the vessel 3, 4, 5.

In accordance with the invention, the member 6 is stamped from sheet metal and includes (see FIGS. 4, 5 and 6) an outwardly projecting central part 11 defining with the wall 2 of the vessel 3, 4, 5 a cavity 12. This projecting central part 11 is surrounded by an exterior part 13 whose surface 13a adjacent the wall 2 of the vessel 3, 4, 5 espouses the curved profile of the latter, as shown in FIGS. 1 to 3.

The shape of the lateral surface 11a of the projecting central part 11 matches the interior surface of the ferrule 10 and the central part 11 is engaged in the ferrule 10 (see FIGS. 1 and 2). The front surface 11b of said projecting part 11 incorporates an opening 7 extended outwardly by a projecting flange 7a. The interior surface of the opening 7 is smooth, as shown in FIGS. 5 and 6.

In FIGS. 1 and 2, the tapping thread 8a of the screw 8 for fixing the handle 1 is engaged in this opening 7.

The exterior part 13 of the stamped member 6 incorporates openings 14 for rivets or the like fixed into the wall of the vessel.

The lateral surface 11a of the projecting central part has a plurality of non-circular faces over which the ferrule 10 fits to prevent it rotating.

The lateral surface 11a of the projecting part 11 is joined to the exterior part by a shoulder 15 against which the end of the ferrule 10 bears.

The stamped member 6 is preferably cut and stamped from sheet aluminum.

The projecting central part 11 has on its lateral surface facing towards the bottom of the vessel 3, 4, 5 one or more openings 16 (see FIG. 4) to drain off any water that may enter the cavity 12.

Despite its thinness (2 mm to 3 mm) and the fact that it is made from aluminum, the fixing member is very rigid because its projecting central part 11 and its exterior part 13 espouse the curved profile of the wall of the vessel.

This projecting central part 11 fits inside the ferrule 10 and prevents it rotating. In particular, as can be seen in FIG. 2, the ferrule 10 espouses the outer peripheral surface of central projecting part 11 with a surface-to-surface contact that extends for a substantial distance in the direction of the length of the handle.

When the fixing member 6 has been riveted to the wall 2 of the vessel, the ferrule 10 is fitted over the projecting part 11 of the member, the end of the handle 1 is fitted inside the ferrule 10, and the screw 8 is inserted into the elongate opening 9 in the handle and the opening 7 in the member 6.

The screw 8 is then turned so that its tapping thread cuts a thread for itself in the interior surface of the opening 7.

The resulting fixing is rigid and the screw remains tight.

There is claimed:

1. In a cooking vessel having a side wall and an elongated handle and means securing said handle to said side wall, said means comprising a member stamped from sheet metal and secured to said side wall, said member having an outwardly projecting central part defining with said side wall a cavity, a screw that passes through an end of said handle and a hole in said central part to hold said handle on said vessel, and a ferrule that fits over said end of said handle and espouses the shape of a peripheral surface of said end of said handle, said ferrule also fitting over said central part; the improvement wherein said ferrule espouses an outer peripheral surface of said central part with a surface-to-surface contact that extends for a substantial distance in the direction of the length of the handle.

2. A cooking vessel according to claim 1, said hole in said central part being surrounded by an outwardly projecting flange.

3. A cooking vessel as claimed in claim 1, wherein said outer peripheral surface of said central part is non-circular as is an internal peripheral surface of said ferrule, thereby to prevent relative rotation of said cooking vessel and said ferrule.

4. A cooking vessel as claimed in claim 1, wherein said metal is aluminum.

* * * * *